US012712910B2

(12) United States Patent
Caselli et al.

(10) Patent No.: US 12,712,910 B2
(45) Date of Patent: Aug. 18, 2026

(54) PROTECTING A DEVICE AGAINST A CYBER INCIDENT

(71) Applicant: Siemens Aktiengesellschaft, Munich (DE)

(72) Inventors: Marco Caselli, Munich (DE); Tobias Hilbig, Munich (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 273 days.

(21) Appl. No.: 18/276,473

(22) PCT Filed: Feb. 11, 2022

(86) PCT No.: PCT/EP2022/053400
§ 371 (c)(1),
(2) Date: Aug. 9, 2023

(87) PCT Pub. No.: WO2022/171809
PCT Pub. Date: Aug. 18, 2022

(65) Prior Publication Data

US 2024/0114051 A1 Apr. 4, 2024

(30) Foreign Application Priority Data

Feb. 12, 2021 (EP) .................................... 21156824

(51) Int. Cl.
*G06F 21/57* (2013.01)
*H04L 9/40* (2022.01)

(52) U.S. Cl.
CPC ................................ *H04L 63/1441* (2013.01)

(58) Field of Classification Search
CPC .................................................. H04L 63/1441
See application file for complete search history.

(56) References Cited

U.S. PATENT DOCUMENTS 12,045,201 B1 * 7/2024 Satish .................. G06F 16/283
2003/0158956 A1 * 8/2003 Tanaka .................. H04L 12/66 709/230
2015/0193808 A1 * 7/2015 Wade ................ G06Q 30/0241 705/14.49

(Continued)

FOREIGN PATENT DOCUMENTS

WO WO 2017086928 A1 5/2017

OTHER PUBLICATIONS

V. Mavroeidis and J. Brule, A nonproprietary language for the command and control of cyber defenses—OpenC2, Computers & Security, 97, 101999., 202.

(Continued)

*Primary Examiner* — Meng Li
(74) *Attorney, Agent, or Firm* — Schmeiser Olsen PLLC

(57) ABSTRACT

A computer-implemented method and a system is provided for protecting at least one device of a target infrastructure against a cyber incident, whereby an infrastructure database contains device-specific information for its devices, by providing a security playbook for the given cyber incident, transforming the security playbook to a transformed playbook, analyzing the respective step of the transformed playbook based on a policy and process database, which shows a rule indicating whether at least a part of the step can be executed without any restriction or only with a restriction or has to be blocked, executing the steps based on the labeled playbook taking the handling label into account and for generating at least one instruction derived from at least one of the steps, and generating a device-specific command based on the instruction and based on a syntax processable by the device.

14 Claims, 10 Drawing Sheets

(56) References Cited

U.S. PATENT DOCUMENTS

| | | | | |
|---|---|---|---|---|
| 2019/0158535 | A1 | 5/2019 | Kedem et al. | |
| 2019/0245713 | A1* | 8/2019 | Lo | H04L 12/2834 |
| 2019/0260769 | A1* | 8/2019 | Sharon | H04L 63/1416 |
| 2020/0067985 | A1* | 2/2020 | Bhargava | G06F 3/0481 |
| 2020/0193022 | A1* | 6/2020 | Lunsford | H04L 63/1416 |
| 2020/0372367 | A1* | 11/2020 | Ha | G06N 3/088 |
| 2021/0092097 | A1* | 3/2021 | Law | H04L 63/101 |
| 2021/0306352 | A1* | 9/2021 | Narula | G06N 5/04 |
| 2022/0239687 | A1* | 7/2022 | Jiang | H04L 63/101 |

OTHER PUBLICATIONS

CACAO Security Playbooks v1.0, Committee Specification, see https://docs.oasis-open.org/cacao/security-playbooks/v1.0/cs01/security-playbooks-v1.0-cs01.pdf.

Splunk Inc., “Demisto Add-on for Splunk | Splunkbase,” Splunk Inc., Sep. 22, 2020. [Online]. Available: https://splunkbase.splunk.com/app/3448/.

Splunk Inc., “Splunk Phantom Security Orchestration & Automation | Splunk,” Splunk Inc., Jun. 25, 2020. [Online]: https://www.splunk.com/en_us/software/splunk-security-orchestration-and-automation.html.

C. Wagner et al. “MISP: The Design and Implementation of a Collaborative Threat Intelligence Sharing Platform”, WISCS ’16: Proceedings of the 2016 ACM on Workshop on Information Sharing and Collaborative Security Oct. 2016 pp. 49-56 https://doi.org/10.1145/2994539.2994542.

PCT International Search Report and Written Opinion of International Searching Authority mailed Jun. 1, 2022 corresponding to PCT International Application No. PCT/EP2022/053400 filed Feb. 11, 2022.

* cited by examiner

```
{
version:0.1,
mode:  "fire-and-forget",
"data-search":[
  {"value": "block_ip", "type": "tag"}
],
"data-deployment":[
  {"value":"192.168.100.100","type":"blacklist"}
  ]
}
```

FIG 4A

SPB

```
{
  "type":"playbook",
  "spec-version": "0.5.1",
  "playbook-version":"1",
  "id":"20829bf1-2d9d-4d50-8dcf-a0882a9957b9",
  "created":"2020-09-11t00:00:00.000000Z",
  "modified":"2020-09-11t00:00:00.000000Z",
  "name":"Demo-IP.Blocking",
  "description":"This is a playbook to deal with malicious IP addresses",
  "labels": ["block ip", "malicious ip"],
  "in_args": ["$$whitelist"],
  "workflow_start":"bc8ca145-e7e8-4a84-b5f2-0f5057dc5f35",
  "workflow":{
    "bc8ca145-e7e8-4a84-b5f2-0f5057dc5f35":{
      "type":"if-condition",
      "name":"Check if an IP address is whitelisted",
      "condition":{
        "type":"pseudo-code",
        "content": "$$blacklist in $$whitelist"
      },
      "on_true":"",
      "on_false":"d4271caf-b4c0-4ff2-adae-9bf18284356a",
      "out_args":[
        "$$filtered_blacklist"
      ]
    },
    "d4271caf-b4c0-4ff2-adae-9bf18284356a":{
      "type":"single",
      "name":"Block IP address in the firewall",
      "command":{
        "type":"firewall-action",
        "action":"deny",
        "target":"$$filtered_blacklist",
        "actuator":"$$firewall"
      },
    "on_success":""
    }
  }
}
```

FIG 4B

TPB

S1 (lines 14–26)

S2 (lines 27–38)

```
{
  "type":"playbook",
  "spec-version": "0.5.1",
  "playbook-version": "1",
  "id":"20829bf1-2d9d-4d50-8dcf-a0882a9957b9",
  "created":"2020-09-11t00:00:00.000000Z",
  "modified":"2020-09-11t00:00:00.000000Z",
  "name":"Demo-IP Blocking",
  "description":"This isa playbook to deal with malicious IP addresses",
  "labels":["block ip", "malicious ip"],
  "in_args": ["192.168.1.0,...,192.168.1.255"],
  "workflow_start":"bc8ca145-e7e8-4a84-b5f2-0f5057dc5f35",
  "workflow":{
    "bc8ca145-e7e8-4a84-b5f2-0f5057dc5f35":{
      "type":"if-condition",
      "name":"Check if an IP address is whitelisted",
      "condition":{
        "type":"pseudo-code",
        "content": "'192.168.100.100' in '192.168.1.0,...,192.168.1.255'"
      },
      "on_true":"",
      "on_false":"d4271caf-b4c0-4ff2-adae-9bf18284356a",
      "out_args":[
        "$$filtered_blacklist"
      ]
    },
    "d4271caf-b4c0-4ff2-adae-9bf18284356a":{
      "type":"single",
      "name":"Block IP address in the firewall",
      "command":{
        "type":"firewall-action",
        "action":"deny",
        "target":"$$filtered_blacklist",
        "actuator":"192.168.1.1"
      },
    "on_success":""
    }
  }
}
```

FIG 4C

LPB, UPB

```
{
  "type":"playbook",
  "spec-version":"0.5.1",
  "playbook-version":"1",
  "id":"20829bf1-2d9d-4d50-8dcf-a0882a9957b9",
  "created":"2020-09-11t00:00:00.000000Z",
  "modified":"2020-09-11t00:00:00.000000Z",
  "name":"Demo-IP Blocking",
  "description":"This is a playbook to deal with malicious IP addresses",
  "labels":["block ip","malicious ip"],
  "in_args":["192.168.1.0,...,192.168.1.255"],
  "workflow_start":"bc8ca145-e7e8-4a84-b5f2-0f5057dc5f35",
  "workflow":{
    "bc8ca145-e7e8-4a84-b5f2-0f5057dc5f35":{
      "type":"if-condition",
      "policy":"execution-OK",
      "name":"Check if an IP address is whitelisted",
      "condition":{
        "type":"pseudo-code",
        "content":"'192.168.100.100' in '192.168.1.0,...,192.168.1.255'"
      },
      "on_true":"",
      "on_false":"d4271caf-b4c0-4ff2-adae-9bf18284356a",
      "out_args":[
        "$$filtered_blacklist"
      ]
    },
    "d4271caf-b4c0-4ff2-adae-9bf18284356a":{
      "type":"single",
      "policy":"execution-confirmation",
      "name":"Block IPaddress in the firewall",
      "command":{
        "type":"firewall-action",
        "action":"deny",
        "target":"$$filtered_blacklist",
        "actuator":"192.168.1.1"
      },
    "on_success":""
    }
  }
}
```

HAL

HAL

HAL

S1

S2

COS

PPDB

```
{
version:0.1,
policy-entries:[
  {"action":"if-condition","mode":"allow"},
  {"action":"firewall-action","mode":"confirm"}
  ]
}
```

PROTECTING A DEVICE AGAINST A CYBER INCIDENT

CROSS-REFERENCE TO RELATED APPLICATIONS

This application claims priority to PCT Application No. PCT/EP2022/053400, having a filing date of Feb. 11, 2022, which claims priority to European Application No. 21156824.1, having a filing date of Feb. 12, 2021, the entire contents both of which are hereby incorporated by reference.

FIELD OF TECHNOLOGY

The following relates to a system and computer-implemented method for protecting at least one device of a target infrastructure against a cyber incident.

BACKGROUND

With an increase of cyber incidents, also called cyber-attacks, the work of incident handling is increasing both in time and complexity. Incident response activities are often guided by best practices and generally are left to the experience of humans that are also performing requirements of companies individually.

Moreover, with the proliferation and the sophistication of cyberattacks, incident response is not scaling up nearly as quickly as required. Besides increasing the number of incident handlers (with the risk of high costs and employees being "idle" in absence of cyberattacks), some more technical solutions to tackle this issue have been proposed. These solutions usually follow two main guidelines: the improvement of information sharing across security teams and the use "orchestration" tools to coordinate response activities from one single "control panel". The idea of sharing structured representations of incident response activities has gathered momentum over the last few years. Examples for such structured representations are CACAO [1] and OpenC2 [2]. Orchestration tools in the context above are for example known from Demisto [3] and Phantom [4]. The paper of Wagner, see [5] also addresses an design and implementation of a collaborative threat intelligence sharing platform.

All these activities result in significantly increasing effort—both financially and for human resources—for defense of cyber incidents. Human efforts can lead to different (individual specific) incident response activities resulting in unpredictable cyber response quality for given installations.

SUMMARY

An aspect relates to a system and a method that allows a cost-effective handling of cyber incident defense for a great variety of cyber incidents and installations.

Embodiments of the invention address a system for protecting at least one device of a target infrastructure against a cyber incident, whereby an infrastructure database contains device-specific information for its devices, with the following units:

Playbook providing unit for providing a security playbook for the given cyber incident, whereby the playbook describes steps to be executed in reaction to the cyber incident and placeholders to be replaced with device-specific information when the security playbook is applied to the target infrastructure;

Instantiation unit for transforming the security playbook to a transformed playbook, whereby the transformation replaces the placeholders with the device-specific information according to the infrastructure database;

Step processing unit for analyzing the respective step of the transformed playbook based on a policy and process database, which shows a rule indicating whether at least a part of the step can be executed without any restriction or only with a restriction or has to be blocked, and for forming a labeled playbook based on the transformed playbook showing the respective rule for at least one part of the step indicated by a respective handling label;

Handling unit for executing the steps based on the labeled playbook taking the handling label into account and for generating at least one instruction derived from at least one of the steps;

Deployment unit for generating a device-specific command based on the instruction and based on a syntax processable by the device, whereby the device-specific command is transmitted via a message to the device for processing the device-specific command by the respective device.

The system's setting with its units supports a great variety of infrastructures, of cyber incidents, of policies and processes tailored to a specific company's requirements and of devices. Due to its setting it is able to adapt to changes regarding the cyber incidents, the infrastructure, the company's requirements and the devices in a very flexible and dynamical way. Another advantage of this system lies in its structure that can the scaled to small and large infrastructures without any specific modifications. Further on, this system is beneficial as it works automatically and allows a high quality and cost-effective handling of cyber incident defense.

The system shows a tremendous flexibility of the incident response automation due to a layered architecture. This approach makes it easy not only to adjust for updating the execution of the units to required changes given e.g., by the security playbook but also to effectively adjust to any technical/operational constraint given by companies and organizations (e.g., sections of the architecture managed by different organizational entities) as well as their target infrastructures.

The system shows a high performance and scalability that is given amongst others by the usage of deployment unit. This unit covers a lightweight and independent software/hardware component that bridges the communication (and possibly physical) gap between the system and the target infrastructure as well as by the possibility of running different configurations of the system independently to manage different zones (e.g., geographical regions).

Another advantage to be mentioned is the confidentiality the system can provide. Due to the aforementioned compartmentalization provided by the layered architecture and especially by the confinement of organizations' internal policies and processes managed by the step processing unit.

The target infrastructure shows several devices, whereby some of the devices can be connected for exchange of information. A device is an entity that can handle one or several tasks on its own, such a personal computer, a router, the gateway, a production unit that performs at least one production step of the production of a product, a medical device for generating medical data such as an x-ray image or an device in a power transmission system. This device can be built by a processor, a memory containing device specific instructions to be executed, whereby the memory and in –/output modules may be connected to the processor and to each other by a data and/or instruction bus.

The infrastructure database contains device—specific information for its devices and optionally also specific target infrastructure data and information such as a list of device addresses that are trusted (=whitelist). The device specific information can be understood as individual features of a respective device, such as its IP address (IP: Internet Protocol), its MAC address (MAC—Media-Access-Control), its feature set addressable via a dedicated interface, the versions of the installed software, its physical location, or its vendor.

The term "protecting" shall be understood as all reasonable kinds of actions that may support the reliability or integrity of the target infrastructure. Hence "protecting" at least one device may cover a blocking of traffic from a malicious sender, an update of a firmware or software, a reboot of a device e.g., to bring the device to a stable state, or setting of dedicated device parameters to a given value range, e.g., to limit its range of activity.

The security playbook describes steps to be executed in reaction to the cyber incident and particular placeholders that shall be replaced with device specific information by the instantiation unit for being applied to the target infrastructure and probably other system specific information. This security playbook may be constructed for example according to a standard CACAO, see [1]. "CACAO defines a schema and taxonomy for collaborative automated course of action operations security playbooks and how these security playbooks can be created, documented, and shared in a structured and standardized way across organizational boundaries and technology cold solutions", see [1], page 2, second paragraph. Other languages to describe the security playbook are XML (XML—extensible markup language) or can be found under [2].

The step is described by one or more attributes that allow to parameterize the step and define its specific execution in order to perform the security playbook. The attributes may include commands and actions, descriptions, references to devices and other objects, data elements to individualize the security playbook to the target infrastructure and/or to the policy and process required for a specific target infrastructure. Examples for such steps and their attributes can be found in [1] or in the examples shown by FIG. 4A. The step may contain activities, e.g., in form of action or commands, that directly reacts to the given cyber incident for example to block traffic from an IP address that sends messages with a potential malicious content.

The placeholder within the security playbook is an element that will be replaced by device specific information as stored in a structured way by the infrastructure database and/or by other units in the system. Some of the placeholders may also be replaced based on the policy and process database and/or based on analysis results of the handling unit.

The cyber incident may be a sniffing software, a virus, or a software that has a malicious effect on the device and the like.

The policy and process database provides in a machine-readable and structured way rules regarding one or more attributes of the steps. For example, such a rule can describe whether one or more lines or attributes of the step can be executed without any restrictions or with some restrictions or cannot be executed and hence shall be blocked from executing. The term restriction means that the execution of one or several attributes of the step may require additional conditions, for example a confirmation from an external confirmation authority or may only executed under certain circumstances, for example if the device of the target infrastructure is in a certain condition such as a maintenance condition, i.e., when the device is a production unit in a production line. In addition, the policy and process database may also give rules on how to execute steps for example which step may be prioritized or how certain placeholders should be set, such as execution time of a respective step.

The handling label is used to indicate the analysis result of the step processing unit based on the policy and process database. The handling label can be stored in a separate file besides the labeled playbook or can be part of the labeled playbook by including one or several additional lines/attributes in the step that indicate a specific meaning of the handling label based on the rule. Integrating the handling label inside the labeled playbook shows the advantage that all information required for the following unit can be found in a compact and good structured way in the labeled playbook.

The handling unit processes the steps based on the labeled playbook taking the handling labels into account. In the case the handling label requires a positive approval for continuing execution of some of the attributes of the step, the handling unit is responsible for requesting such an approval and for executing or not executing or executing with limitations these *attributes of the step based on the result of this approval. In addition, the handling unit also resolves placeholders that were not resolved before by the instantiation unit or the step processing unit. Such a placeholder can describe a dynamic content that is not directly resolved with the information from the infrastructure database and/or policy and process database, but can be the resolved after executing one or more *attributes of one step and/or several steps, for example comparing a blacklist with a whitelist that results in a dynamic output depending on both lists. Further on the handling unit derives and/or extracts from at least a part of one or several steps at least one instruction that indicates an action and optionally additional information required to execute this action to be used later on by the deployment unit and/or the device. The instruction can be a copy of one or several attributes (lines) from one or several steps.

The handling unit generates the instruction based on the labeled playbook. The term "based on the labeled playbook" means that the handling unit uses the labeled playbook directly or uses an updated playbook that is derived from the labeled playbook. The term "derived" can mean that the labeled playbook can be used without or with some modifications, i.e., reordering of steps or given timing of execution of the steps respectively.

The device-specific command represents a specific action to be performed by the device but organized in such a way that it can be understood by the receiving device. This specific action can be a blocking of traffic or reboot of the device for example. This the deployment unit is aware of the syntax that is processable by the device, e.g., in particular by an interface of the device, whereby the generation of the device specific command is based on this syntax, too. The syntax of the device is known to the deployment unit. To understand which specific syntax to use for generating the device specific command the instruction may cover additional information specifying either the syntax and/or device specific information allowing the deployment unit to select the correct syntax. The syntax itself may be defined by XML indicating a correspondence between a type of action within a command of the step to the device-specific command understandable by the device. By this the deployment unit may have a list of available action/command types and its corresponding device specific commands of the device in the device specific syntax.

The deployment unit itself may serve one specific type or brand of devices, such as routers from company "vendorC", but may also contain the syntax of various devices from various manufacturers for various types.

The message transporting the device-specific command to the device may be based on a common communication protocol, such as IP or Bluetooth. This message may cover as an address of the device an IP address being forwarded to the deployment unit within the instruction. The message may also be constructed for a proprietary interface that the deployment unit can connect via a cable or wireless depending on the manufacturer's specification. This message may also be understood as being able to handle authorization and/or authentication activities required by the device before accepting the device-specific command. The deployment unit may handle such authorization and/or authentication activities.

Embodiments of the invention further target the system, whereby the cyber incident contains at least one tag describing the cyber incident and being used by the playbook providing unit for selecting the security playbook from a number of security playbooks. The cyber incident may be reported by an external cyber incident reporting system or by a trigger signal whereby this report includes descriptive information for the cyber incident being a potential threat for the target infrastructure. The tag shows the benefit that the playbook providing unit can select the security playbook in a reliable way and such that the protection of the target infrastructure can be optimized in reaction to the given cyber incident.

The system can be enhanced by using placeholders representing i.e., a reference, and an action and/or data of the security playbook that are transformed to a device-specific reference, device-specific action and/or a device-specific data respectively based on the infrastructure database. By this enhancement the system can be used in a very flexible way as the placeholders of the security playbook can be adapted to various configurations of the target infrastructure.

In a further enhancement of the system, the policy and process database provides for at least one of the placeholders of one of the steps, whereby the respective placeholder is unchanged by the transformation, a rule describing a handling instruction for transforming this placeholder to a transformed placeholder. By this the execution of the steps is more flexible as the concrete execution of at least a part of the step can be additionally controlled by the policy and process database, e.g., based on specific requirements of the company providing the policy and process database. In addition, this flexibility can even be further increased over time, as the specific rule and/or handling instruction may change over time, e.g., depending on previous cyber incidents or depending on a status of a respective device and/or the target infrastructure. Such a placeholder may be a time element describing when to execute the part of the step and this placeholder is replaced by a transformed placeholder with a concrete date and time for the execution, e.g., "15 Jan. 2021 at 14:05".

The system may be further enhanced in such a way that the handling unit is represented by at least the following units:

- execution strategy builder unit for verifying an executability of the steps of the labeled playbook, for defining an order of execution of the steps and for generating an updated playbook based on the labeled playbook and based on the definition of the order of execution;
- execution strategy administrator unit for executing the steps of the updated playbook taking the handling label into account and for generating at least one instruction derived from at least one of the steps.

This enhancement optimizes the execution of the labeled playbook, because the execution strategy builder unit checks whether the steps of the labeled playbook can be executed and may also reorganize the steps such that a parallel execution of the labeled playbook is possible. In addition, the use of the execution strategy builder unit is beneficial, because a complex role back in case of execution failures by the execution strategy administrator unit is omitted, too.

In a beneficial enhancement of the system, the handling unit further contains a deployment communication unit for transmitting the at least one of the instructions to the deployment unit via the message and for receiving a status based on an execution result of the instruction from the deployment unit.

This shows the advantage that a complexity for transmitting the instruction can be organized within a unit that is specialized for the communication with a specific implementation of a deployment unit. For example, one of the deployment units communicated by an IP protocol over LAN (LAN—Local Area Network) and another deployment unit by ProfiBus protocol. Hence the execution strategy builder unit and the execution strategy administrator unit can work independently of the communication protocol between the deployment communication units thus reducing their respective complexity for implementation.

The system may show a further advantageous enhancement, whereby the execution strategy administrator unit generates the instruction based on a command step of the updated playbook, in particular of at least a part of one of the steps of the updated playbook, whereby the command step describes at least an action to be executed by one of the devices.

This shows the effect that the generation of the instruction is simplified and shows less grounds for errors. In particular, the instruction may be a copy of lines from one of the respective steps describing the command step. This command step may contain the action to be executed and the device—also known as target—that should execute the action and optionally one or more data elements or attributes further specifying how to execute this action. Such a data element may describe a blacklist in the case of a blocking action of traffic from one or more addresses of the blacklist. In another example the data may describe the time of execution of the action.

In another enhancement of the system, the execution strategy administrator unit performs a specific action signaled by the handling label of the step before continuing to execute the respective step.

By this the execution of the steps can be individualized for specific requirements indicated by the policy and process database and optionally also based on status information received from the deployment unit on the execution of already executed steps of the updated playbook. This increases the stability of the execution of the updated playbook and hence of the target infrastructure that is changed due to the execution of the updated playbook too.

This enhancement may be further enhanced such that the specific action represents a request to receive a confirmation for continuing to execute the respective step, with a stop of the continuation in case of the confirmation being negative. By this enhancement the flexibility of the execution of the updated playbook can be further enhanced as the execution of the steps can be individualized further, e.g., the confirmation may rely on external input such as a manual input or from another system based on embodiments of the invention that have already performed the step for which the confirmation is requested.

The system may be further enhanced such that the playbook providing unit shows at least a playbook retrieval unit (PRU) for providing the security playbook based on at least a keyword describing the cyber incident from a playbook database.

This enhancement allows to retrieve from a number of security playbooks the specific security playbook that fits best for the given cyber incident. By this the quality of the reaction to the given cyber incident is increased tremendously.

This enhancement of the system may be further improved such the playbook providing unit further contains a playbook organization unit for organizing the search of the security playbook in the playbook database based on the keyword, for organizing search results by prioritizing the search results to provide the security playbook with a high priority and for receiving a new security playbook to be stored in an organized way in the playbook database.

This enhancement increases the speed and quality of the selection of the security playbook because the playbook organization unit provides the search results in a prioritized way and hence the most relevant security playbook for the given cyber incident is selected. In addition, due to the optimized storage of the security playbooks the time to retrieve the security playbook to be handed to the instantiation unit is optimized resulting in faster reaction time of the system to a given cyber incident. The playbook organization unit is also capable of handling new security playbooks. This allows to further increase the quality of the system as new cyber incidents can be supported.

By a further enhancement of the system the playbook providing unit in addition contains a playbook verification unit responsible for receiving a draft playbook and for validating and transforming it to generate the new security playbook that shows a compatible description to be processable by the playbook organization unit.

This enhancement increases the quality of the system significantly, because new security playbooks are made available for the system that may react on new cyber incidents, probably up to now unknown cyber incidents, or on given cyber incidents but in an optimized way. This “learning” and “improvement” is performed in an automatic way hence reducing the cost for maintenance of the system dramatically.

Embodiments of the invention further show a computer-implemented method for protecting at least one device of a target infrastructure against a cyber incident, whereby an infrastructure database contains device-specific information for its devices, with the following method steps:

- Providing a security playbook for the given cyber incident, whereby the playbook describes steps to be executed in reaction to the cyber incident and placeholders to be replaced with device-specific information when the security playbook is applied to the target infrastructure;
- Transforming the security playbook to a transformed playbook, whereby the transformation replaces the placeholders with the device-specific information according to the infrastructure database;
- Analyzing the respective step of the transformed playbook based on a policy and process database, which shows a rule indicating whether at least a part of the step can be executed without any restriction or only with a restriction or has to be blocked, and for forming a labeled playbook based on the transformed playbook showing the respective rule for at least one part of the step indicated by a respective handling label;
- Executing the steps based on the labeled playbook taking the handling label into account and for generating at least one instruction derived from at least one of the steps;
- Generating a device-specific command based on the instruction and based on a syntax processable by the device, whereby the device-specific command is transmitted via a message to the device for processing the device-specific command by the respective device.

The computer-implemented method realizes the corresponding system and shows the same advantages as the system.

The computer-implemented method may be further enhanced by one or more of the enhancements of the corresponding system. The advantages of these enhancements are the same as for the corresponding system.

BRIEF DESCRIPTION

Some of the embodiments will be described in detail, with reference to the following figures, wherein like designations denote like members, wherein:

FIG. 3 shows a description of a cyber incident;

FIG. 4A shows a security playbook;

FIG. 4B shows a transformed playbook;

FIG. 4C shows a labeled playbook;

FIG. 5 shows an infrastructure database;

DETAILED DESCRIPTION

Figure 1:
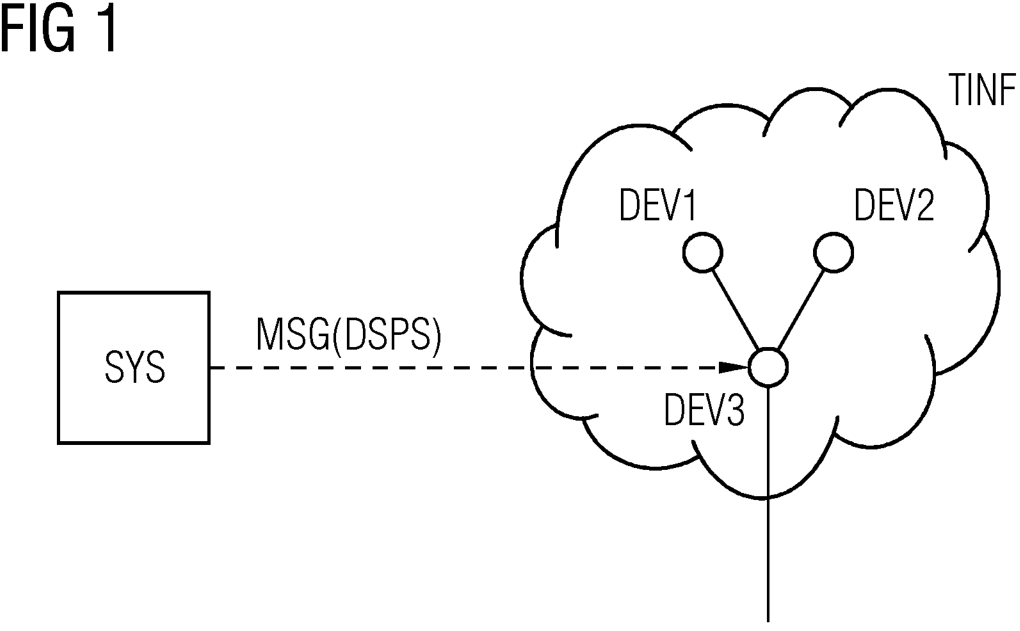
FIG. 1 shows a target infrastructure with 3 devices.

FIG. 1 shows three devices DEV1, DEV2, DEV3, whereby the first device and the second device DEV1, DEV2 represent computer terminals that are used by employees of a company for their daily work. The third device DEV3 is a router connecting the first and the second device to an external network. All three devices are located within an intranet of the company, whereby the intranet is called also target infrastructure TINF.

Figure 2:
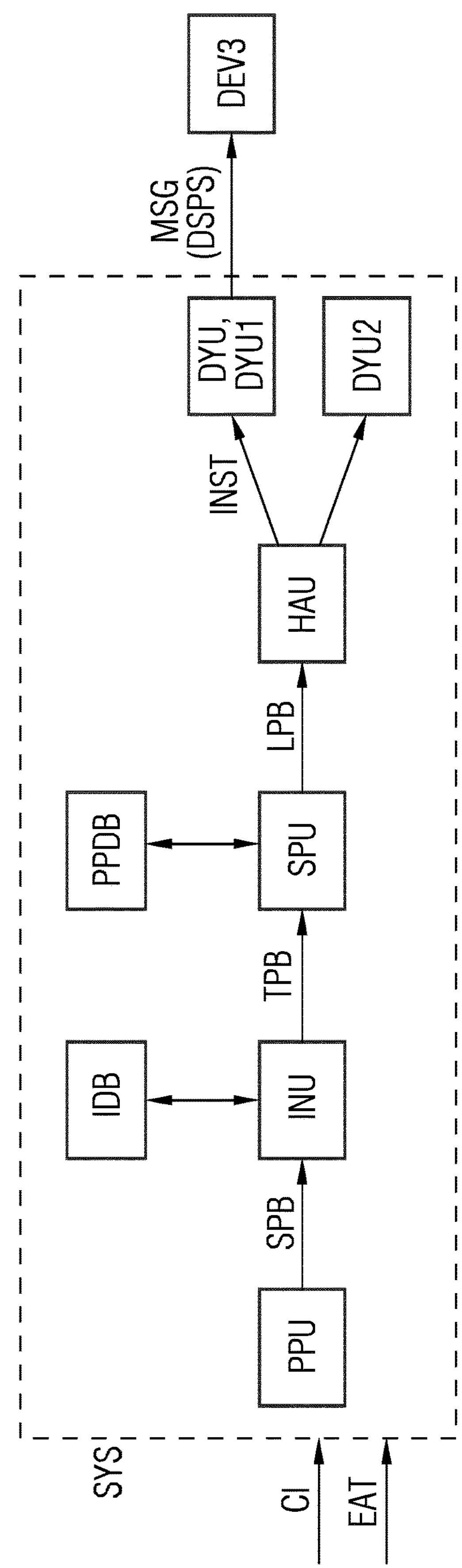
FIG. 2 shows a system for generating at least one device specific process step, showing a playbook processing unit, a instantiation unit, a step processing unit and a handling unit.
Figure 6:
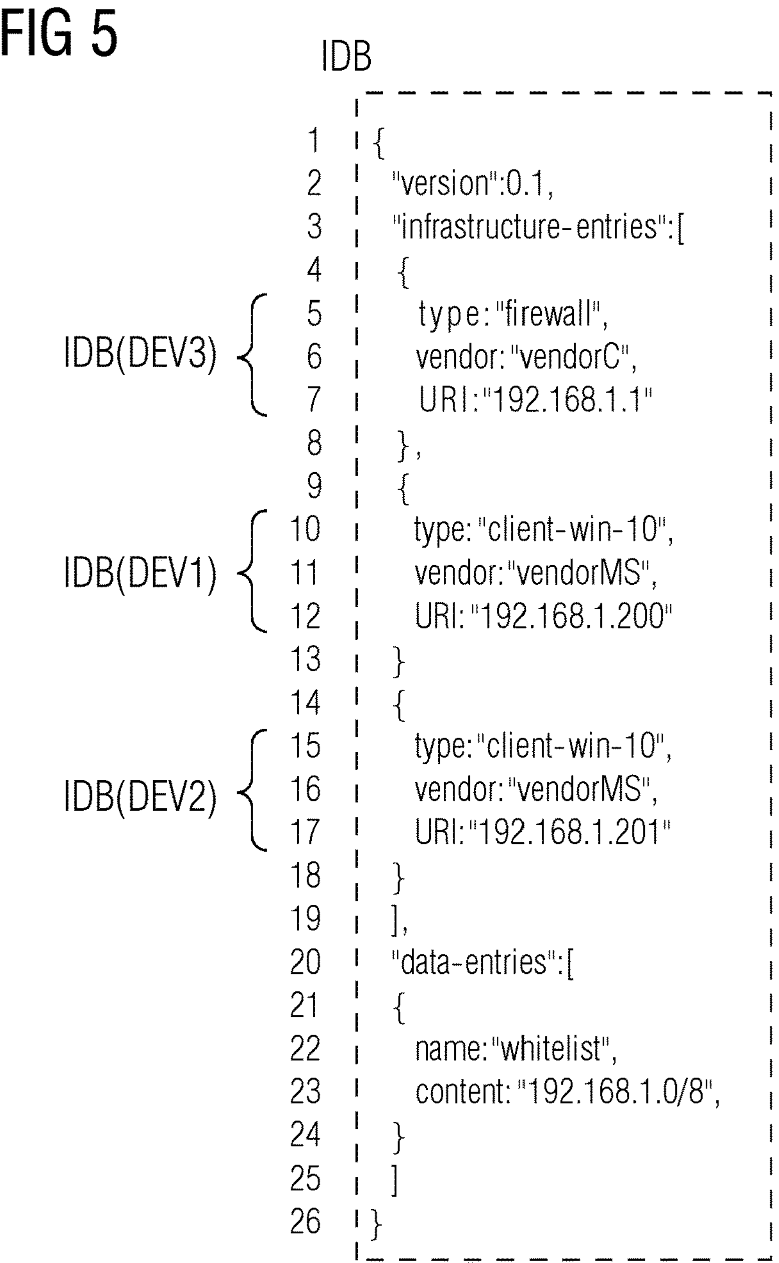
FIG. 6 shows a policy and procedure database.

FIG. 2 shows as an example a system SYS that receives a cyber incident CI, e.g., from a cyber incident information platform (no shown in FIG. 2). The cyber incident reports that are a specific device is sending malicious messages that may harm devices. Hence the system is triggered by this cyber incident to generate at least one device—specific process step DSC for one or more devices of the target infrastructure.

The syntax of the example code of the following FIGS. 3 to 6 is based on a language/data format JSON (JSON=Java Script Object Notation) that allows to represent in a human-readable way data objects consisting of attribute—value pairs and array data types. Other languages such as XML (XML—Extensible Markup Language) may also be used and serve the same purpose for explaining embodiments of the invention with an example by FIG. 2. For sake of better readability line numbers are added to the example code of FIGS. 3 to 6 only.

FIG. 3 shows an example code for a cyber incident description. Lines 4 to 6 indicate that this cyber incident requires to block one or more IP addresses as stated in the field value "block_ip" in reaction to the cyber incident. This tag can be used by the system to identify a security playbook that fits best for the given cyber incident. In addition, lines 7 to 9 indicate a blacklist address as an universal resource locator URI that is described in the example as an IPv4 (IP: Internet protocol, v4: version4) address of 192.168.100.100. Activities from this IP address are to be blocked, because they may harm the devices of the target infrastructure as indicated by this cyber incident.

A playbook providing unit PPU of the system provides a security playbook SPB that is specifically designed for the given cyber incident or for a specific kind of the given cyber incident. Alternatively, a description with several keywords may be provided with the given cyber incident that is used by the playbook providing unit to identify the playbook that fits best with this description.

FIG. 4A shows an example of such a security playbook containing two steps S1, S2 of a sequence indicated by the word "workflow". The respective step is designed as a machine—readable description with attributes by a given syntax. The syntax and semantic uses attributes describing i.e., descriptions, such as the attribute "name" in line 16, pseudo-code, such as a if-condition, see lines 17 to 22, with the attribute "content" for the if command, the result of "if" when true or false in lines 21-22, or commands, see attribute "command" with attributes inside, see lines 31-34, describing the command in details. The respective step is characterized by its type, such as in line 15 or 31. This is similar to a respective instruction set for a programming language. The reference [1] gives more details about the syntax.

The syntax also contains placeholders, equivalent to variables in the programming language, describing references, actions and data. The reference is used to address a specific device(s) of the infrastructure, see e.g. line 34, the action describes a dedicated activity to be executed, whereby a concrete action can be target infrastructure and/or device depended—not shown in FIG. 4A—, and the data describes specific data of the device or the target infrastructure to be considered, e.g. the data $$whitelist represents a list of IP addresses that are explicitly allowed on the infra structure. In this example the placeholders PH1, PH2 are identified with "$$". Besides the placeholders mentioned above the security playbook may cover further placeholders that are to be replaced with a dedicated content in a later stage of embodiments of the invention.

The playbook providing unit selects this specific security playbook, because the tag of the cyber incident stating "block_ip" is found as a label in line 10 of the security playbook. The playbooks used in this description are based on the draft standard "CACAO Security Playbook Version 1.0" [1].

Lines 1 to 13 and 39 of the security playbook of FIG. 4A contain some structural syntax elements, such as a description. Lines 14 to 26 represent the first step and lines 27 to 38 the second step S2. The syntax element of the first and second step S1, S2 have the following meaning:

Line Description of the attributes and their functionality

14 Unique identifier of first step, whereby the lines being part of the first step are included in the brackets "{" and "}" of lines 14 and 26 respectively;

15 The "type" describes the kind of instruction being represented by the first step S1; in FIG. 4A the type is a if-condition;

16 The syntax element "name" is a description of the first step, e.g., for information for an administrator of the system;

17-20 These lines describe the condition to be checked for the if-condition; in line 19 it is defined that the condition shall be executed by verifying whether an IP address of a blacklist ($$blacklist) is part of an IP address of a white list ($$whitelist); in line 11 a list of IP addresses, see $$whitelist, is being provided to the steps for their execution;

21 This line represents what shall be done in case that the condition verified is true; in this example no action shall be taken;

22 This represents what shall be done in case that the condition verified is false; in this example the second step is executed; this is indicated by the unique identifier of the second step;

23-25 These lines describe that a filtered backlist ($$filtered blacklist) shall be outputted by the first step as a result of its execution;

28 The type "single" represents a single procedure to be executed by the device, in this case a blocking of an IP address;

29 The name contains a description of step 2;

30-35 This command code indicates to execute another step next;

31 The type "firewall" shows that the following lines must be executed for a device of a type "firewall";

32 This line states an action for one or several devices indicated by the actuator attribute in the next line that the device-specific command will request from the device to deny forwarding a message from a specific sender that is described by the target element of line 33;

33 Messages that shall be denied are described by the element target, in this example by an data defined by the placeholder $$filtered_blacklist; this placeholder will be filled with one or several addresses, e.g., IPv4 addresses, from the blacklist depending on the outcome of the first step; more details can be found in the description for the execution strategy administration unit;

34 This line contains the actuator, in this example at least one of the three devices that shall execute the deny action; the concrete device described by the $$firewall element will be replaced in a later step by help of the infrastructure database;

FIG. 2 shows an infrastructure database IDB that describes the target infrastructure in a machine-readable, including device-specific information DSI for its devices DEV. FIG. 5 represents such device-specific information. Lines 5 to 7 describe infrastructure entries IDB(DEV3) for the third device that the third device DEV3 is of type "firewall" from vendor "vendorC" and can be addressed by an unique resource identifier URI that is set as an IPv4 address "192.168.1.1". Lines 10 to 12 describe infrastructure entries IDB(DEV1) for the first device that the first device DEV1 is of type "client-win-10", a computer with an operating system Microsoft Windows 10, from vendor "vendorMS" and can be addressed by an unique resource identifier URI that is set as an IPv4 address "192.168.1.200".

Lines 15 to 17 describe infrastructure entries IDB(DEV2) for the second device that the second device DEV2 is a computer of type "client-win-10" from vendor "vendorMS" and can be addressed by an unique resource identifier URI that is set as an IPv4 address "192.168.1.201". Further on, the infrastructure database IDB defines as data the whitelist for the target infrastructure represents all devices in the target infrastructure, being identified by its respective IPv4 address, see lines 20 to 24. In line 23 the term "192.168.1.0/8" means all IPv4 addresses from 192.168.1.0 to 192.168.1.255 are part of the target infrastructure. In this example the term whitelist represents all devices that are trusted and do not represent any harm to the target infrastructure and its devices.

The security playbook is given to an instantiation unit INU of the system that replaces the placeholders with target infrastructure specific information as defined by the infrastructure database and information given by the cyber incident description. Hence the references are replaced by device-specific reference, e.g., the placeholder data $$whitelist with ip-address "192.168.1.0, . . . , 192.168.1.255" in the first step. The notation " . . . " in this case is used to signal all IPv4 addresses that are in between 192.168.1.0 and 192.168.1.255. Further on the placeholder $$blacklist is also replaced by the IP address of the blacklist "192.168.100.100" indicated in the cyber incident description. Further on, the place holder for the reference $$firewall is replaced by the IPv4 address of the third device by "192.168.1.1", as its type is "firewall".

For the case there are 2 or more devices in the infrastructure database that show the same type, then the reference of the transformed playbook shows the device-specific references of these 2 or more devices. For example, there are two routers in the infrastructure database with IP addresses "192.168.1.1" and "192.168.1.57" respectively, then line 34 of FIG. 4C would read "acturator":"192.168.1.1, 192.168.1.57".

FIG. 4B shows a transformed security playbook TSBP covering the device specific information for the placeholders. The underlined text in FIG. 4B present the replaced text phrases. Hence the transformed security playbook contains security steps adapted to the target infrastructure. In the case a placeholder can't be replaced based on the information in the infrastructure database the placeholder is kept within the transformed playbook for later transformation. May be such a placeholder describes a variable for covering a result of a step that is being used by another step. Such residual placeholders will be handled by one of the following units.

The transformed security playbook is given to a step processing unit SPU of the system for analyzing which steps are feasible taking the company's policies and procedures into account. This verification is performed by use of a policy and procedure database PPDB that represents the company's policies and procedures in a machine-readable description. A sample code can be seen in FIG. 6. Lines 3-6 define specific policies and procedures, such as in line 4 that defines that an attribute of type "if-condition" of the steps can be executed without any restrictions, and the attribute of type "firewall-action" requires a confirmation input. Depending on the implementation, the confirmation input can be manually given by a human or automatically by a confirmation database (not shown inf FIG. 1) that may resolve the confirmation requirement on a history of previous confirmations that were allowed or disallowed. Hence lines 4 and 5 respectively can be understood as rules indication whether a part of the steps can be executed without any restriction, only with restrictions, such as a required confirmation or are even blocked.

As a result of this analysis, specific handling labels HAL are added to the transformed security playbook that results in a labeled security playbook LSPB. The handling labels indicated which step or parts of it needs a confirmation before execution or is not allowable to be executed. An example for the labeled playbook LPB can be found in FIG. 4C, whereby the labeled playbook is based on the transformed playbook of FIG. 4B. In FIG. 4C the lines 15*a* and 28*a* are included indicating the mode of execution, e.g., "execution-ok" indication that no confirmation is required and "execution-confirmation" indicating that a confirmation is required, see attribute "policy".

Further on, the handling label can indicate that steps should be executed in a specific order for performance or process reasons. In another example the policy and process database may request that whenever the transformed playbook contains a "block-ip" action, a "open-ticket" step is to be included to the transformed playbook for execution before executing the step showing the "block-ip" action. This "inserted" step will open a ticket in a ticketing system, keeping track of the receipt of the confirmation and allow execution of another step only after positive confirmation.

The handling unit HAU of the system executes the steps based on the labeled playbook. The first step S1 is executed by the handling unit immediately as there is no restriction on its execution. In our example the IP address of the blacklist is not part of the whitelist, see "on false" part in line 22 of FIG. 4C. Hence the first step requests in line 22 (on false) of the labeled playbook to execute the second step indicated by a specific second step identifier. Within the second step there is a restriction that the second step can only be executed after confirmation. For this the handling unit requests confirmation. When the confirmation is positive it executes the second step, otherwise the second step is not further executed, or the execution of the labeled playbook is aborted.

In case of further processing of the second step, the handling unit generates an instruction INST for the third device, being the firewall, based on the "actuator" in line 34 of the labeled playbook. The instruction also covers the action "deny" and the blacklist "192.168.100.100".

This instruction is given to a deployment unit DYU1 of the system that is capable of generating a device-specific command DSC that is processable by the type of the third device. The system shows two deployment units, the second deployment unit DYU2 is capable to generate device-specific commands for the first and second device, both being of type "client-win10" of vendor "vendorMS" and the first deployment unit DYU1 can generate device-specific commands specifically for the type "firewall" of the vendor "vendorC". By this the respective deployment unit is specialized to generate the device-specific step DSC that can be understood and processed by the third device.

The device-specific step DSC contains in this example an instruction set for the third device that blocks traffic of the IP address indicated by the backlist when processed by the third device. The device-specific command is being sent to the third device by a message that is based on a TCP (TCP-Transmission Control Protocol). This message is sent by the system to the third device containing as payload the device-specific step DSC. In another implementation, the deployment unit is connected via a wired connection directly to a programming interface of the third device, whereby the message with the device-specific command is formed as a programming command of the programming interface. In an alternative implementation the message is sent via a wireless interface, e.g., via Bluetooth, to the third device, because the system is located in near distance to the third device.

The third device receives the message and performs the device-specific step DSC by executing it. As a result, the third device blocks after the execution any traffic to and from the IP address(es) shown in the blacklist.

The handling unit HAU may be implemented with 3 separate units. An execution strategy builder unit ESBU receives the labeled playbook and verifies how its steps can be executed. This may include a prioritization of steps, e.g., due to devices with higher relevance than other devices in the target infrastructure, and parallelization of steps. Further on, the execution strategy builder unit may divide the labeled playbook into partitions that contain steps that should be entirely roll-backed, if an execution of one or more steps or device-specific steps fail. This ensures that the target infrastructure results in a safe condition after any step executed from the labeled playbook, even in case of an error. The execution strategy builder unit ESBU makes the final adjustments to the order of the steps, and may check, if the labeled playbook can be executed at all. If it can't be executed, it drops the labeled playbook and e.g., nothing happens further. When the labeled playbook can be executed the execution strategy builder unit ESBU generates an updated playbook UPB and finally forwards it to an execution strategy administrator unit ESAU.

The execution strategy administrator unit ESAU executes the updated playbook step by step. First the first step is executed and depending on the result, the second will be executed next. As stated above, the second step can only be executed after confirmation. Hence the execution strategy administrator unit sends a request CREQ to an external unit (not shown inf FIG. 7) and after receipt of a positive confirmation CONF it processes the second step further. The execution strategy administrator unit may check whether the content of the second step was executed by a previous playbook based on entries in a deployment history data base DHDB for a respective device and hence may only be a (useless) duplication for the respective device. In such a case the execution strategy administrator unit may decide to delete the requested step for optimization purpose. Otherwise, the second step or parts of it are given as an instruction INST. This instruction may be a copy of the second step or parts of it from the updated playbook as this is self-contained meaning it covers all relevant information required by the deployment unit DYU. According to the example of FIG. 4C the instruction may cover the lines 31 to 34 of the command attribute that indicates the command for one or several devices.

In the case there are more than one device referenced as actuator in the updated playbook, then the execution strategy administrator may generate two instructions, one of each of these devices or, if the deployment unit is capable to serve both devices, such as the router example above, one instruction is sent to the deployment unit that generates two device-specific commands that are sent by respective messages to the respective devices.

Further on, the execution strategy administrator may receive a status message STAT, indicating whether the instruction was executed in success or without success by the deployment unit and/or device respectively. In addition, the response may also give reasons and/or feedback on the successful or unsuccessful execution of the instruction, such as the time to process the instruction or how many firewall rules were changed due to the instruction. This feedback can help the execution strategy administrator unit ESAU to understand e.g., reasons for an unsuccessful execution or how the instruction was executed for optimization of generation of instruction in updated playbooks in future. Depending on this response the execution strategy administrator may initiate activities such the roll-back of specific steps in order to set the target infrastructure to a safe and/or stable condition.

For simplicity of the example the labeled playbook and the updated playbooks show the same content as can be seen in FIG. 4C. In general, the updated playbook is based on the labeled playbook, e.g., by different sequence of the steps, or with less steps if steps were deleted. The execution strategy administrator unit evaluates in the first step S1 that the IPv4 address of the blacklist "192.168.100.100" isn't part of the whitelist "192.168.1.0, . . . , 192.168.1.255". Hence the placeholder $$filtered_blacklist is set to "192.168.100.100", because of the "if-condition" and indicated by the argument "out_args". The execution strategy administrator unit replaces this placeholder in the second step. After the positive confirmation it generates the instruction based on the command step COS, see e.g., FIG. 4C, in the second step. By this the instruction INST may be set by the following lines:

"type": "firewall-action",
"action":"deny",
"target":"192.168.100.100",
"actuator": "192.168.1.1"

As the execution strategy administrator unit may know, which of the deployment units is capable of generating the device-specific command for the actuator with the IPv4 address 192.168.1.1, the line with the actuator information may be omitted in the instruction INST.

A deployment communication unit DCU of the handling unit HAU takes care of a communication with its counterpart deployment communication unit DCU of the deployment unit via a communication line. For example, the instruction is sent to the deployment unit and feedback information regarding status STAT of the execution of this instruction is transmitted in return via this communication line, too.

Figure 8:
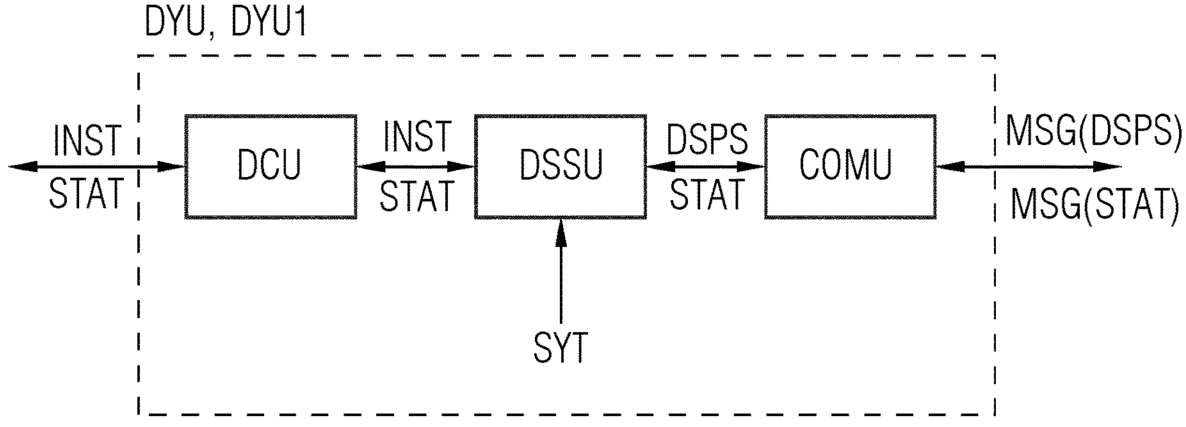
FIG. 8 shows an example implementation of the deployment unit.

FIG. 8 shows an example implementation of one of the deployment units DYU, DYU1, DYU2. The deployment communication unit DCU of the deployment unit receives the instruction and forwards it to a device-specific step unit DSSU that generates based on the instruction the device-specific command DSC. The device—specific step unit translates the received instruction for a given subset of devices of the target infrastructure, which fall under its responsibility. This translation depends on the piece of hardware/software the deployment unit is communicating to. This translation is implemented by a module written for specific kind of target hardware/software running within the device—specific step unit. In the case a new deployment unit shall be established it undergoes a ramp—up phase in which, after establishing communication of the software or hardware under its responsibility, it becomes an integral part of the deployment architecture. To achieve this, information about the new deployment unit, such as to which devices it is responsible for, is stored in the infrastructure database and thus made available for all units in the system. After generating the at least one device-specific process step DSC the device-specific step unit forwards it to a communication unit COMU that is able to communicate with the specific device by the message containing the device-specific process step.

Figure 7:
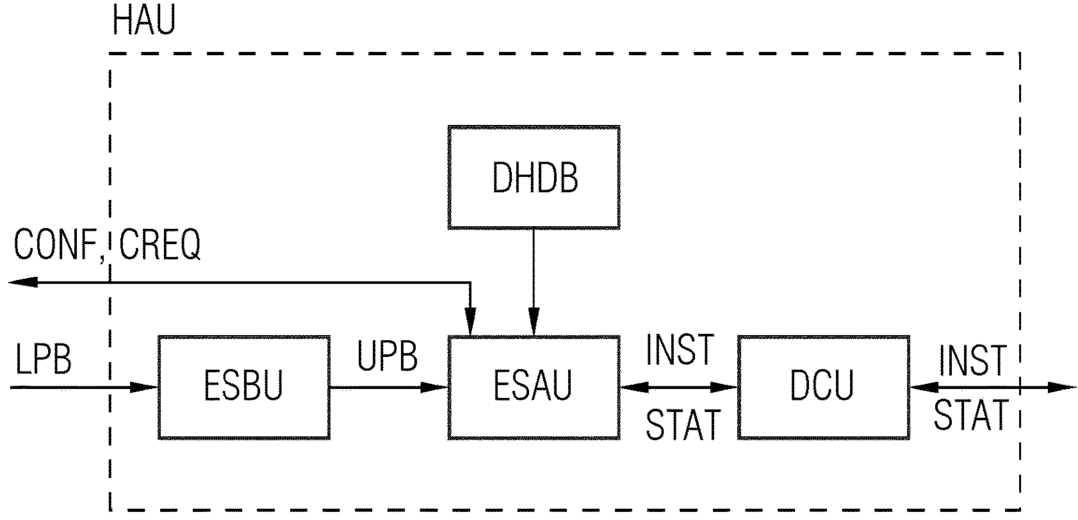
FIG. 7 shows an example implementation of the handling unit.

FIGS. 7 and 8 show status information STAT that can be handed back to the chain for informing some of the units about a status and/or an execution status along the chain of units. For example, the device that received a message with the device-specific processing step may send a message with its status about a successful or unsuccessful execution of the device-specific processing step. This status can be handed back the chain from the communication unit to the execution strategy administrator unit ESAU in order to execute a specific action such a roll-back. The status STAT may be changed or unchanged along the chain. The status STAT in the FIGS. 7 and 8 shall also be understood such that any of the units may generate such a status and forward it along the chain to the communication unit and/or to the execution strategy administrator unit and be used by any unit receiving the status.

Figure 9:
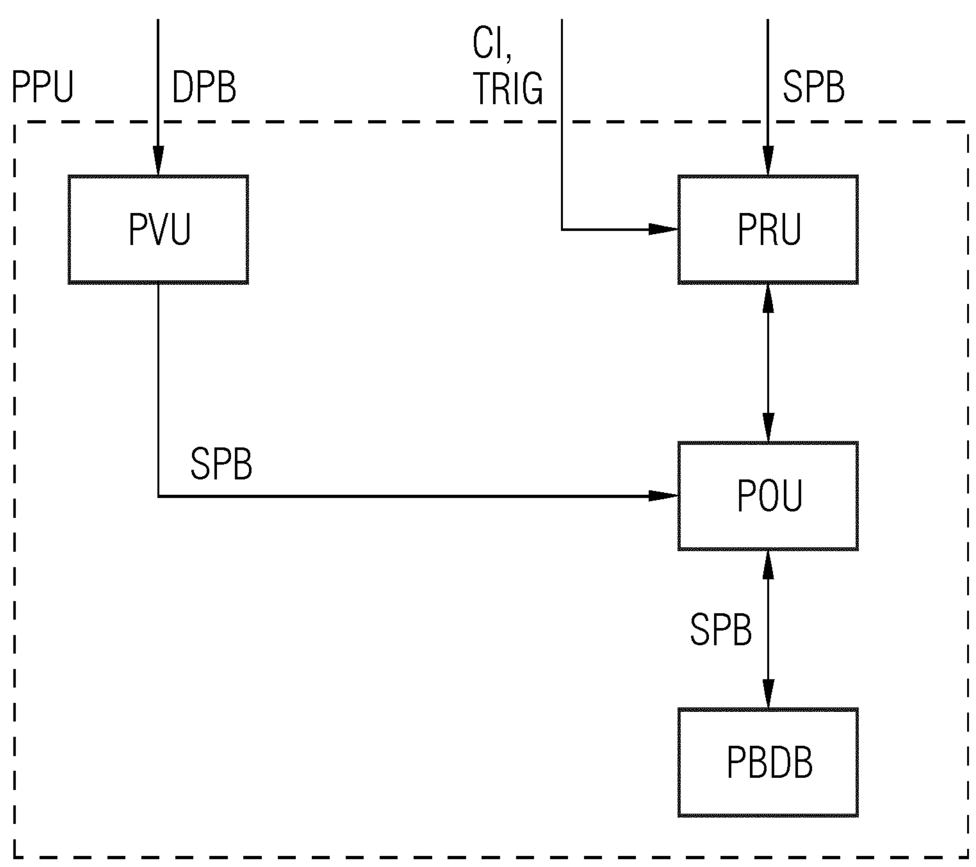
FIG. 9 shows an example implementation of the playbook processing unit.

FIG. 9 shows an example implementation of the playbook providing unit PPU. After occurrence of the cyber incident CI or a trigger TRIG, e.g., initiated by an administrator of the system or after a software update of some of the units of the system, the playbook retrieval unit PRU starts a retrieval of the security playbook SPB by asking a playbook organization unit POU. The playbook organization unit is responsible for implementing the logic required to retrieve stored labels. This logic response to the need of searching security playbooks, as well as prioritizes the search results based on a set of keywords that may be provided within the trigger TRIG or the cyber incident CI. This unit includes several search paradigms among which the possibility of using free text, structured text or specific key/value pairs may be used. This unit accesses a playbook database PBDB that stores a number of security playbooks. After a security playbook is found that matches best to the cyber incident or trigger, the found security playbook is handed from the playbook organization unit to the playbook retrieval unit to the playbook processing unit PPU. If no playbook is found this request returns an error that no playbook was found. The trigger may be by a cyber incident that is triggered manually.

Besides the process to retrieve the security playbook, the playbook processing unit may contain additional units to access, verify and organize playbooks coming from a sharing platform that provides draft playbooks DPB shaped for certain cyber incidents or tasks. As shown in FIG. 9 a playbook verification unit PVU receives such a draft playbook and validates it in order not to push incorrect or ambiguous data to the playbook database. Such validation includes searching for unresolved references, detecting recursive calls, locating duplicated playbooks and playbooks that show an incompatible description with the implemented one for the security playbooks used by the system. After validating the draft playbook, it is parsed and transformed into a common representation resulting in the security playbook. The playbook organization unit receives this security playbook and stores it in the playbook database PBDB.

The units can be implemented in software, hardware or in a combination of software and hardware. The unit may contain a processing unit being able to process one or more program instructions that are stored for execution on a memory that is connected via a bus to the processing unit. In addition, in —/output interfaces may be connected to the bus for communication purposes between two or more units. In the alternative implementation of the system several units may be integrated such that they use one processing unit with the attached memory and interfaces to reduce cost for the implementation.

Embodiments of the invention are described by examples based on the system. The examples are also valid for the inventive method and can also be described based on the inventive method too.

Figure 10:
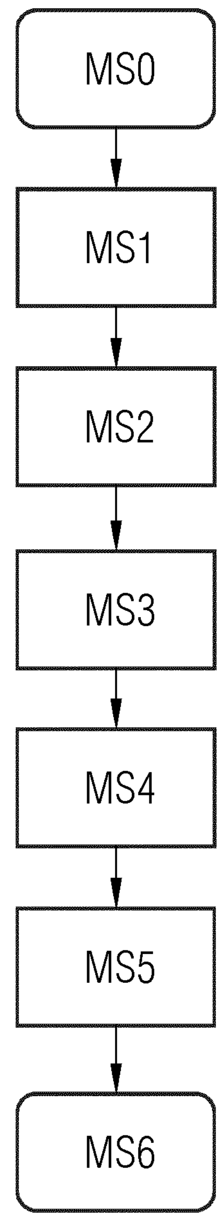
FIG. 10 shows a flow chart representing the inventive computer-implemented method.

Embodiments of the invention may also be realized by a computer-implemented method for protecting at least one device of a target infrastructure against a cyber incident, whereby an infrastructure database contains device-specific information for its devices, with the following method steps MS1 to MS5, whereby the method start in a starting method step MS0 and ends in a ending method step MS6, see FIG. 10:

MS1: Providing a security playbook for the given cyber incident, whereby the playbook describes steps to be executed in reaction to the cyber incident and placeholders to be replaced with device-specific information when the security playbook is applied to the target infrastructure;

MS2: Transforming the security playbook to a transformed playbook, whereby the transformation replaces the placeholders with the device-specific information according to the infrastructure database;

MS3: Analyzing the respective step of the transformed playbook based on a policy and process database, which shows a rule indicating whether at least a part of the step can be executed without any restriction or only with a restriction or has to be blocked, and for forming a labeled playbook based on the transformed playbook showing the respective rule for at least one part of the step indicated by a respective handling label;

MS4: Executing the steps based on the labeled playbook taking the handling label into account and for generating at least one instruction derived from at least one of the steps;

MS5: Generating a device-specific command based on the instruction and based on a syntax processable by the device, whereby the device-specific command is transmitted via a message to the device for processing the device-specific command by the respective device.

Embodiments of the invention can be used in a hospital, where the first and devices may represent X-ray devices or in an industrial production line whereby the first and second device are specific production machines such as a robot and a drilling machine.

Although the present invention has been disclosed in the form of embodiments and variations thereon, it will be understood that numerous additional modifications and variations could be made thereto without departing from the scope of the invention.

For the sake of clarity, it is to be understood that the use of “a” or “an” throughout this application does not exclude a plurality, and “comprising” does not exclude other steps or elements.

REFERENCES

[1] CACAO Security Playbooks v1.0, Committee Specification, see https://docs.oasis-open.org/cacao/security-playbooks/v1.0/cs01/security-playbooks-v1.0-cs01.pdf

[2] V. Mavroeidis and J. Brule, A nonproprietary language for the command and control of cyber defenses—OpenC2, Computers & Security, 97, 101999., 202

[3] Splunk Inc., “Demisto Add-on for Splunk|Splunkbase,” Splunk Inc., 22 Sep. 2020. [Online]. Available: https://splunkbase.splunk.com/app/3448/

[4] Splunk Inc., “Splunk Phantom Security Orchestration & Automation Splunk,” Splunk Inc., 25 Jun. 2020. [Online]:

https://www.splunk.com/en_us/software/splunk-security-orchestration-and-automation.html

[5] C. Wagner et al. "MISP: The Design and Implementation of a Collaborative Threat Intelligence Sharing Platform", WISCS '16: Proceedings of the 2016 ACM on Workshop on Information Sharing and Collaborative Security October 2016 Pages 49-56 https://doi.org/10.1145/2994539.2994542

The invention claimed is:

1. A system for protecting at least one device of a target infrastructure against a cyber incident, whereby an infrastructure database contains device-specific information for devices, the system comprising:

one or more processors configured to:

provide a security playbook for the cyber incident, whereby the security playbook describes steps to be executed in reaction to the cyber incident and placeholders to be replaced with device-specific information when the security playbook is applied to the target infrastructure;

transform the security playbook to a transformed playbook, whereby the placeholders include device references identified by placeholder syntax within the security playbook that are replaced with device-specific addresses from the infrastructure database based on device type to generate the transformed playbook;

analyze the respective step of the transformed playbook based on a policy and process database, which shows a rule indicating whether at least a part of the step can be executed without any restriction or only with a restriction or has to be blocked, and for forming a labeled playbook based on the transformed playbook showing the respective rule for at least one part of the step indicated by a respective handling label;

execute the steps based on the labeled playbook taking the handling label into account and for generating at least one instruction derived from at least one of the steps; and generate a device-specific command based on the instruction and based on a syntax processable by the device, whereby the device-specific command is transmitted via a message based on a communication protocol to the device for processing the device-specific command by a respective device.

2. The system according to claim 1, wherein the cyber incident contains at least one tag describing the cyber incident and is used for selecting the security playbook from a number of security playbooks.

3. The system according to claim 1, wherein the placeholders further represent an action and/or data of the security playbook that are transformed to a device-specific action and/or device-specific data based on the infrastructure database.

4. The system according to claim 1, wherein the policy and process database provides for at least one of the placeholders of one of the steps, whereby the respective placeholder is unchanged by the transformation, a rule describing a handling instruction for transforming this placeholder to a transformed placeholder.

5. The system according to claim 1, wherein the one or more processors are further configured to:

verify an executability of the steps of the labeled playbook, for defining an order of execution of the steps and for generating an updated playbook based on the labeled playbook based on the definition of the order of execution; and execute the steps of the updated playbook taking the handling label into account and for generating at least one instruction derived from at least one of the steps.

6. The system according to claim 5, wherein the one or more processors are configured to transmit the at least one of the instructions via the message and for receiving a status based on the execution result of the instruction.

7. The system according to claim 5, wherein the one or more processors are configured to generate the instruction based on a command step of the updated playbook, of at least a part of one of the steps of the updated playbook, whereby the command step describes at least an action to be executed by one of the devices.

8. The system according to claim 5, wherein the one or more processors are configured to perform a specific action signaled by the handling label of the step before continuing to execute the respective step.

9. The system according to claim 8, wherein the specific action represents a request to receive a confirmation for continuing to execute the respective step, with a stop of the continuation in case of the confirmation being negative.

10. The system according to claim 1, wherein the security playbook is provided based on at least a keyword describing the cyber incident from a playbook database.

11. The system according to claim 10, wherein a search of the security playbook in the playbook database based on the keyword is organized such that search results are prioritized to provide the security playbook with a high priority, and a new security playbook is received and stored in an organized way in the playbook database.

12. The system according to claim 11, wherein a draft playbook is received, validated, and transformed to generate the new security playbook that shows a compatible description to be processable.

13. A computer-implemented method for protecting at least one device of a target infrastructure against a cyber incident, whereby an infrastructure database contains device-specific information for devices, comprising:

providing a security playbook for the given cyber incident, whereby the security playbook describes steps to be executed in reaction to the cyber incident and placeholders to be replaced with device-specific information when the security playbook is applied to the target infrastructure; transforming the security playbook to a transformed playbook, whereby the placeholders include device references identified by placeholder syntax within the security playbook that are replaced with device-specific addresses from the infrastructure database based on device type to generate the transformed playbook;

analyzing the respective step of the transformed playbook based on a policy and process database, which shows a rule indicating whether at least a part of the step can be executed without any restriction or only with a restriction or has to be blocked, and for forming a labeled playbook based on the transformed playbook showing the respective rule for at least one part of the step indicated by a respective handling label;

executing the steps based on the labeled playbook taking the handling label into account and for generating at least one instruction derived from at least one of the steps; and generating a device-specific command based on the instruction and based on a syntax processable by the device, whereby the device-specific command is transmitted via a message based on a communication protocol to the device for processing the device-specific command by a respective device.

14. The computer-implemented method according to claim 13, wherein the computer-implemented method is further implementing and realizing one or several of enhancements of a corresponding system.

* * * * *